United States Patent
Eaton et al.

(10) Patent No.: US 7,796,944 B2
(45) Date of Patent: Sep. 14, 2010

(54) COMMUNICATION SYSTEM FOR DYNAMIC MANAGEMENT OF A PLURALITY OF OBJECTS AND METHOD THEREFOR

(75) Inventors: Eric T. Eaton, Lake Worth, FL (US); Von Mock, Boynton Beach, FL (US); Omid Tahernia, Austin, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 2307 days.

(21) Appl. No.: 10/321,267

(22) Filed: Dec. 17, 2002

(65) Prior Publication Data

US 2004/0203377 A1    Oct. 14, 2004

(51) Int. Cl.
*H04Q 7/20* (2006.01)
(52) U.S. Cl. ............... 455/41.2; 455/456.1; 455/553.1; 455/414.2
(58) Field of Classification Search ............. 455/456.6, 455/41.2, 456.1, 414.2, 419, 435.1, 435.3, 455/456.2, 456.3, 456.5, 9, 13.1, 515, 517, 455/520, 519, 41.1, 553.1; 709/224, 227, 709/316; 701/213, 35; 705/1, 28; 370/338, 370/401; 700/115
See application file for complete search history.

(56) References Cited

U.S. PATENT DOCUMENTS

| | | | | |
|---|---|---|---|---|
| 6,292,747 | B1 * | 9/2001 | Amro et al. | 455/456.6 |
| 6,901,304 | B2 * | 5/2005 | Swan et al. | 700/115 |
| 2002/0059420 | A1 * | 5/2002 | Lin et al. | 709/224 |
| 2002/0095308 | A1 * | 7/2002 | Pragelas et al. | 705/1 |
| 2003/0225893 | A1 * | 12/2003 | Roese et al. | 709/227 |
| 2004/0039504 | A1 * | 2/2004 | Coffee et al. | 701/35 |
| 2005/0215280 | A1 * | 9/2005 | Twitchell, Jr. | 455/553.1 |

\* cited by examiner

*Primary Examiner*—John Lee
(74) *Attorney, Agent, or Firm*—Hisashi D. Watanabe (57) ABSTRACT

A communication system (100) dynamically manages a plurality of objects (105). Each object (120) has a communication device (145) placed within or in close proximity to the object (120) for communicating a plurality of object information (245). A group controller (220) communicates with the communication device (145) and takes over responsibility for communication within the communication system (100) for the communication device (145) when the object location (130) comes within a communication range of the group controller (220).

29 Claims, 7 Drawing Sheets

FIG. 1

| TIMESTAMP | IDENTIFICATION | PROXY | LOCATION | SENSOR |
|---|---|---|---|---|
| T1 | ADDRESS | | GPS 1 | TEMP 31 F |
| T2 | GC1 ADDRESS | GC1 | GPS 2 | TEMP 30 F |
| T3 | GC2 ADDRESS | GC2 | GPS 3 | 34 HRS 3 MIN |
| T4 | ADDRESS | | GPS 4 | 3 HRS 34 MIN |
| T5 | GC3 ADDRESS | GC3 | GPS 5 | |

COMMUNICATION SYSTEM FOR DYNAMIC MANAGEMENT OF A PLURALITY OF OBJECTS AND METHOD THEREFOR

BACKGROUND OF THE INVENTION

1. Field of the Invention

This invention relates in general to communication systems and more particularly to communication systems for dynamically managing a plurality of object devices.

2. Description of the Related Art

Worldwide communication capabilities made possible by the technology revolution of the past decade has created a truly global commerce environment. For example, the Internet has created a global shopping mall for anyone with access to a computer. The Internet is collection of over 25,000 computer networks connected through a communication backbone (NSFNET backbone) funded by the National Science Foundation (NSF) and is currently managed by Advanced Network System (ANS). A subscriber obtains an account with an organization's host computer (server) that is connected to the Internet through one or more networks. Traditionally, the subscriber is connected to the server through telephone lines using a personal computer (PC) and a modem.

Global commerce results in increased global shipping of packages. Rather than go to the corner shopping store to purchase an item, a consumer can order the item remotely (for example, using a telephone or the Internet), pay with a credit card, and provide an address for the item to be shipped to. Both the seller and the buyer thereafter have an interest in tracking the shipping progress of the individual item.

Today, some shipping companies use bar codes that are placed on boxes that are scanned as the unit moves from location to location. Each handler of the box uses a delivery information device to scan in the tracking number plus package details and send it to a data center, for example over packet data radio. One drawback to this approach is that there is no ability to communicate or track the box itself. The tracking is of a labeled bar code that someone located in some location has scanned. Therefor, if the bar code is not scanned, or is left unattended by a person, there is no way to check on the location of the box. Further, once a package is picked up and physically scanned, it is not scanned again until it arrives at its next destination. It is simply assumed that the package is on the truck that it was scheduled to be on in between the two scans.

Recently, some shipping companies have implemented more sophisticated systems, which use a combination of Global Positioning System technology and sub-microscopic video cameras and microphones to provide real-time tracking information for packages even after they've arrived at their destination. As an example, the shipping company can insert a sub-microscopic chip inside the package for feeding audio, video, and geopositioning information via satellites during the shipping process to a data center providing a tracking history for the individual package.

There are a number of drawbacks to the wireless tracking approach using electronics inserted into individual packages. One issue is that when packages are loaded in the back of trucks they are most likely going to be unable to receive/transmit radio frequency (RF) signals. Either the trucks themselves act as RF shields or the containers around the device act as RF shields. Larger shipping containers can also act as RF shields. Receiving and transmitting data from the individual package therefore is not possible. A second issue is that the electronics typically need to be small and battery operated but at the same time need to operate over a long period of time, which may be required for shipping the product to its final destination.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
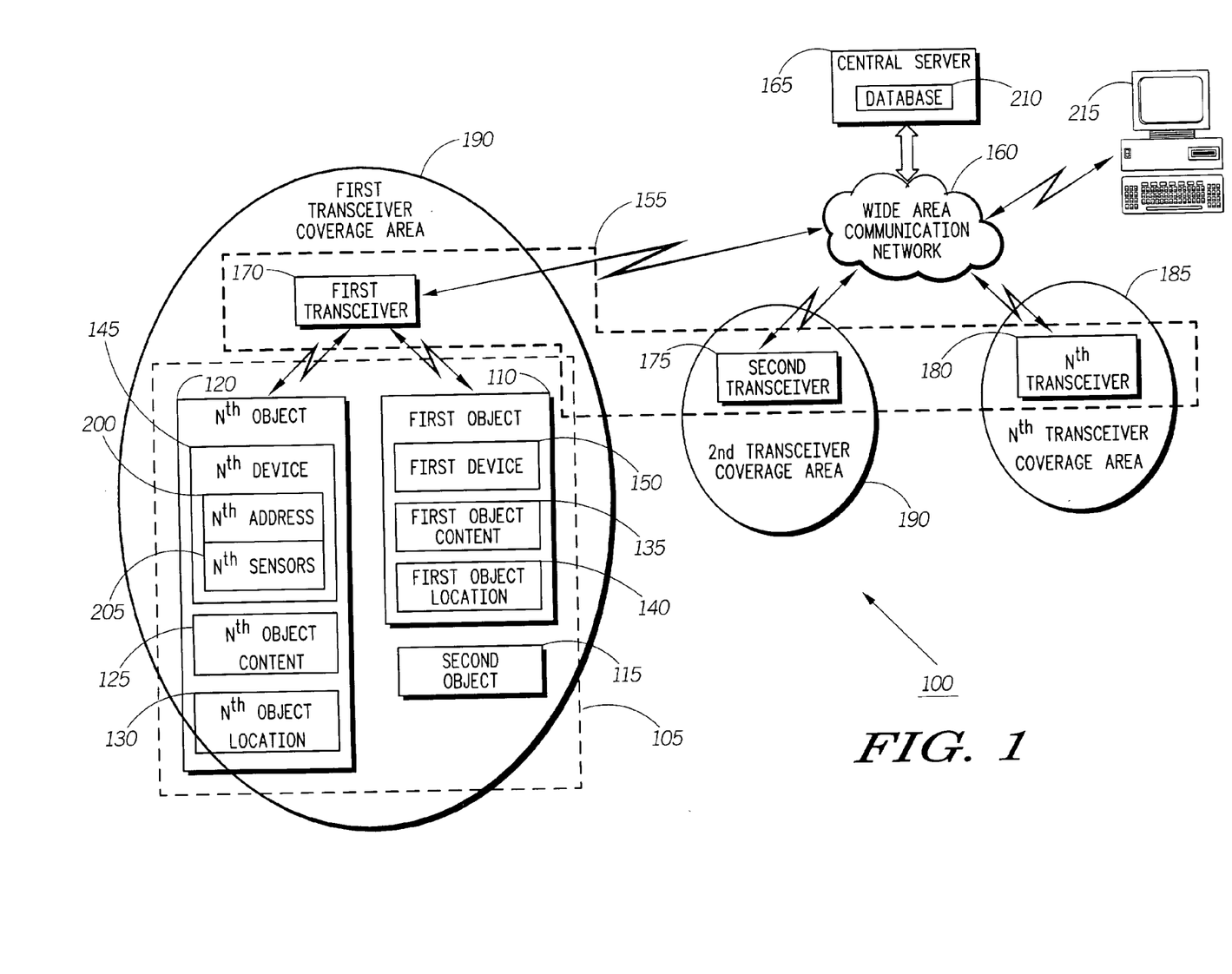
FIGS. 1 and 2 are electronic block diagrams of a communication system for dynamic management of a plurality of objects in accordance with a preferred embodiment of the present invention.

Referring to FIG. 1, an electronic block diagram of a communication system 100 for dynamic management of a plurality of objects 105 in accordance with the present invention is shown. The communication system 100 preferably includes the plurality of objects 105, a plurality of transceivers 155, a wide area communication network 160, and a central server 165.

The plurality of objects 105, for example, includes a first object 110, a second object 115, and an Nth object 120. Each object 120 of the plurality of objects 105 contains an object content 125 and is currently located at an object location 130. For example, the first object 110 contains a first object content 135 and is currently located at a first object location 140. Preferably, and in accordance with the present invention, a communication device 145 is placed within or in proximity to each object 120. For example, a first communication device 150 is placed within or in proximity to the first object 110.

The communication system 100 further comprises a plurality of transceivers 155 such as a first transceiver 170 and a second transceiver 175. Each transceiver 180 of the plurality of transceivers 155 is responsible for controlling communication traffic in its respective transceiver coverage area 185. For example, the first transceiver 170 is responsible for controlling communication traffic in a first transceiver coverage area 190; and the second transceiver 175 is responsible for controlling communication traffic in a second transceiver coverage area 190. Typically, each transceiver 180 will be centrally located, although other positions may be desirable subject to surrounding terrain or propagation conditions. As will be appreciated by those of ordinary skill in the art, each transceiver 180 can receive and/or transmit signals from/to a plurality of communication devices that roam throughout the communication system 100 such as the communication device 145 and the first communication device 150.

In accordance with the present invention, each communication device 145 assigned for use in the communication system 100 has an address or identity assigned thereto which is a unique selective call address in the communication system 100. For example, the communication device 145 located within or in proximity to the object 120 has an address 200 assigned thereto which is a unique selective call address in the communication system 100. The address 200 enables the transmission of various messages from at least one transceiver 180 only to the communication device 145, and identifies the messages and responses received at the transceiver 180 from the communication device 145. Preferably, the communication device 145 communicates with one of the plurality of transceivers 155 such as the first transceiver 170 to send information regarding the object location 130 and other pertinent information about the object content 125. It can be appreciated that the means of communication to the first transceiver 170 can include but is not limited to cellular communications such as GSM (Global System for Mobile Communications), TDMA (Time Division Multiple Access), CDMA (Code Division Multiple Access), 802.11 or the like.

The object 120, for example, can be located in a warehouse, a boat dock or equivalent storage area. The object location 130 in one embodiment can be derived from the world network of global positioning satellites where location along with time can be derived by the orbiting satellites. It will be recognized by one of ordinary skill in the art that a cellular network can derive location information by triangulating an arrival signal of the object 120 via communication between the communication device 145 and two or more transceivers such as the first transceiver 170 and the second transceiver 175. In a preferred embodiment, one or more sensors 205 monitor the environment surrounding the object 120 and/or the object contents 125 to determine temperature, humidity, pressure, electromagnetic field, light spectrum, radiation, and the like.

Within the communication system 100, the plurality of transceivers 155 communicates with the central server 165 via the wide area communication network 160. For example, sensor information received by the first transceiver 170 from the communication device 145 is transmitted to the central server 165 through the wide area communication network 160 where the information is stored, for example, in a database 210. It will be appreciated by one of ordinary skill in the art that the wide area communication network 160, in accordance with the present invention, can function utilizing any wireless radio frequency (RF) channel, for example, a two-way messaging channel, a mobile cellular telephone channel, or a mobile radio channel. Similarly, it will be appreciated by one of ordinary skill in the art that the wide area communication network 160 can function utilizing other types of wireless communication channels such as infrared channels and/or Bluetooth channels. Further, it will be appreciated by one of ordinary skill in the art that the wide area communication network 160 can function utilizing a wireline communication channel such as a local area network (LAN) or a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The WAN, for example, can use a physical network media such as X.25, Frame Relay, ISDN, Modem dial-up or other media to connect devices or other local area networks. In the following description, the term "wide area network" refers to any of the wide area network mentioned above or an equivalent.

Preferably, a customer communication device 215 can interrogate either the central server 165 or the Nth object 120 via the wide area communication network 160 to retrieve the information stored in the database 210 or in the Nth object 120. For example, a customer can use his/her customer communication device 215 to retrieve information stored in the database 210 about the object content 125 and/or the object location 130 of the object 120 communicated to the central server 165 using the communication device 145. It will be appreciated by one of ordinary skill in the art that the customer communication device 215, in accordance with the present invention, can be a mobile cellular telephone, a mobile radio data terminal, a mobile cellular telephone having an attached data terminal, a personal computer having a communication means either built in or attached, a personal digital assistant (PDA), a two-way messaging device, or the like.

Figure 2:
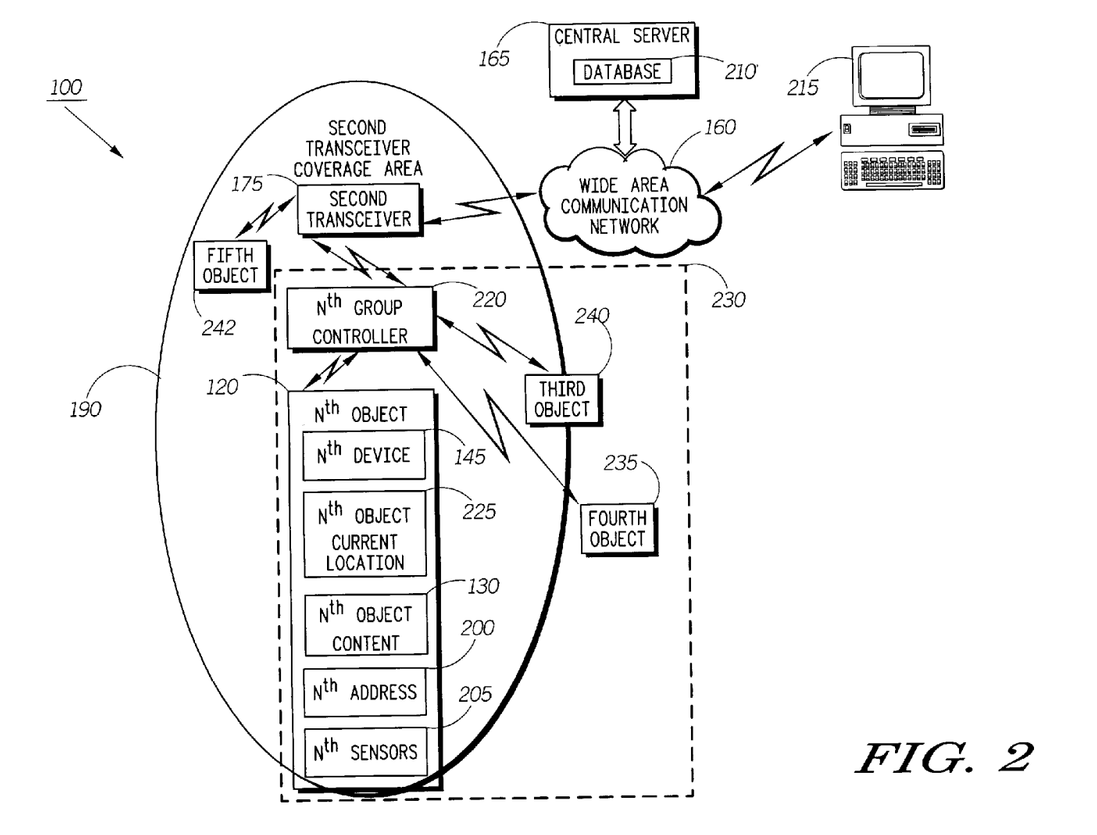

FIG. 2 is an electronic block diagram of the communication system 100 for dynamic management of a plurality of objects 105 in accordance with one embodiment of the present invention. FIG. 2 specifically illustrates the object 120 moving into proximity of a group controller 220. In other words, a current object location 225 of the object 120 is within proximity of the group controller 220. For example, the movement of the object 120 can be the manual labor movement of a person picking up a box containing the object 120 from a warehouse floor and placing the object 120 within a delivery truck. As the communication device 145 within the object 120 comes within communication range of the group controller 220, the communication device 145 can communicate with the group controller 220 and request that the group controller 220 acts as a proxy on the behalf of the object 120. It will be appreciated that one ordinary skilled in that the communication device 145 can incorporate 802.11, Bluetooth, RFID passive and active, or other short range wireless technologies as a means for communicating with the group controller 220. As illustrated in FIG. 2, once the group controller 220 agrees to act as a proxy on behalf of the object 120, the object 120 becomes a member of a dynamic group 230 organized by the group controller 220. As illustrated, the dynamic group 230 can include one or more objects located within both the coverage range of the group controller 220 and the second transceiver coverage area 190 such as object 120. Further, the dynamic group 230 can include one or more objects located outside of the second transceiver coverage area 190 but within the coverage and of the group controller 220 such as the fourth object 235. Further the dynamic group 230 can include one or more objects within the coverage range of the group controller 220 and partially within the second transceiver coverage area 190 such as the third object 240. Further, it will be appreciated by those of ordinary skill in the art that one or more objects can be located within the second transceiver coverage area 190 but outside of the coverage range of the group controller 220 such as the fifth object 242. As illustrated, the fifth object 242 can communicate directly with the second transceiver 175.

In accordance with the present invention, the group controller 220 has communication responsibility with the wide area communication network 160 via the second transceiver 175 on behalf of each of the objects within the dynamic group 230 such as the object 120, the third object 240, and the fourth object 235. The group controller 220 therefore replaces each of the communication devices located within or in proximity to each of the associated objects within the dynamic group 230 for communication with the second transceiver 175. The second transceiver 175 is notified to communicate all information from/to each of the objects within the dynamic group 230 using a group controller network address 445 of the group controller 220 rather than the individual address 200 of each communication device 145 with each object 120. In a preferred embodiment the central server 165 can communicate with the group controller 220 about the object contents 130 of each object within the dynamic group 230 such as the object 120, the third object 240, and the fourth object 235. In addition, the customer communication device 215 belonging to a customer interested in the shipment status of the object 120 can interrogate the central server 165 about the object contents 130 of the object 120.

Preferably the group controller 220 determines it is responsible for communication between the central server 165 and at least one communication device about the object in which the communication device is associated prior to managing the communication for the at least one communication device. For example, the group controller 220 can determine it is responsible for communication between the central server 165 and the communication device 145 about the object 120 when the object location 130 comes within a communication range of the group controller 220. In one embodiment, the group controller 220 can have an associated group controller destination and the object 120 can have an associated object destination. The group controller 220 then can determine it is responsible for communication between the central server 165 and the communication device 145 about the object 120 when the group controller destination and the object destination are substantially similar. Alternatively, the group controller 220 can determine it is responsible for communication between the central server 165 and the communication device 145 about the object 120 in response to receiving an instruction from either the central server 165 or the object 120. (i.e. via the communication device 145). Further, the group controller 220 can have a group controller priority and the object 120 can have an object priority. The group controller 220 can then determine it is responsible for communication between the central server 165 and the communication device 145 about the object 120 when the group controller priority and the object priority are substantially similar.

In accordance with the present invention, as the object 120 moves location, it can move in and out of a plurality of dynamic groups. For example, the object 120 can communicate directly with one or more of the plurality of transceivers 155 at one or more locations as illustrated in FIG. 1 and become a member of one or more dynamic groups of one or more group controllers at one or more other locations as illustrated in FIG. 2, during the object's movement within the communication system 100. For example, the object 120 can be dynamically grouped with other items on a factory shelf with one group controller. After a period of time, the object 120 can be moved to another location in which the object 120 is not part of a dynamic group of a group controller. In the new location, the object 120 can communicate with the central server 165 using the communication device 145 through the wide area communication network 160 via one or more of the plurality of transceivers 155 employing short range wireless technology such as 802.11, Bluetooth, RFID, or a wide area wireless network such as GPRS, CDMA or the like.

Figure 3:
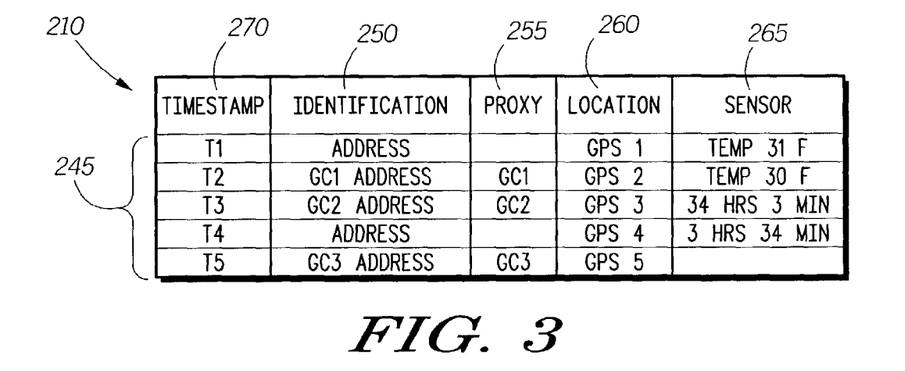
FIG. 3 is a block diagram of a database maintained by a central server for use within the communication system of FIGS. 1 and 2 in accordance with a preferred embodiment of the present invention.

FIG. 3 is an exemplary block diagram of the database 210 maintained within the central server 165. The database 210 preferably includes a plurality of object information 245 received for each of the plurality of objects 105. As illustrated, the plurality of object information 245 for the object 120 can include an identification 250, a proxy 255, a location 260, and a sensor information 265 for each timestamp 270. The time stamp 270 is the time when the object information was transmitted to the central server 165 from the object 120. The identification of the object 120 identifies the object 120 within the communication system 100. For example, the identification 250 can be the address 200 of the object 120 when the object 120 is not within a dynamic group of a group controller. Similarly, the identification 250 can be the group controller address 272 of the group controller 270 when the object 120 is a member of the dynamic group 230. The proxy 255 identifies the group controller communicating on behalf of the object 120 for that particular timestamp. The location 260 identifies the location information for the object 120 at the time stamp. The sensor information 265 includes reported sensor readings at the corresponding time stamp. Sensor information can include, for example, temperature readings, radiation exposure, light exposure, humidity, pressure, magnetic field, time in transit or other related sensor information.

Figure 4:
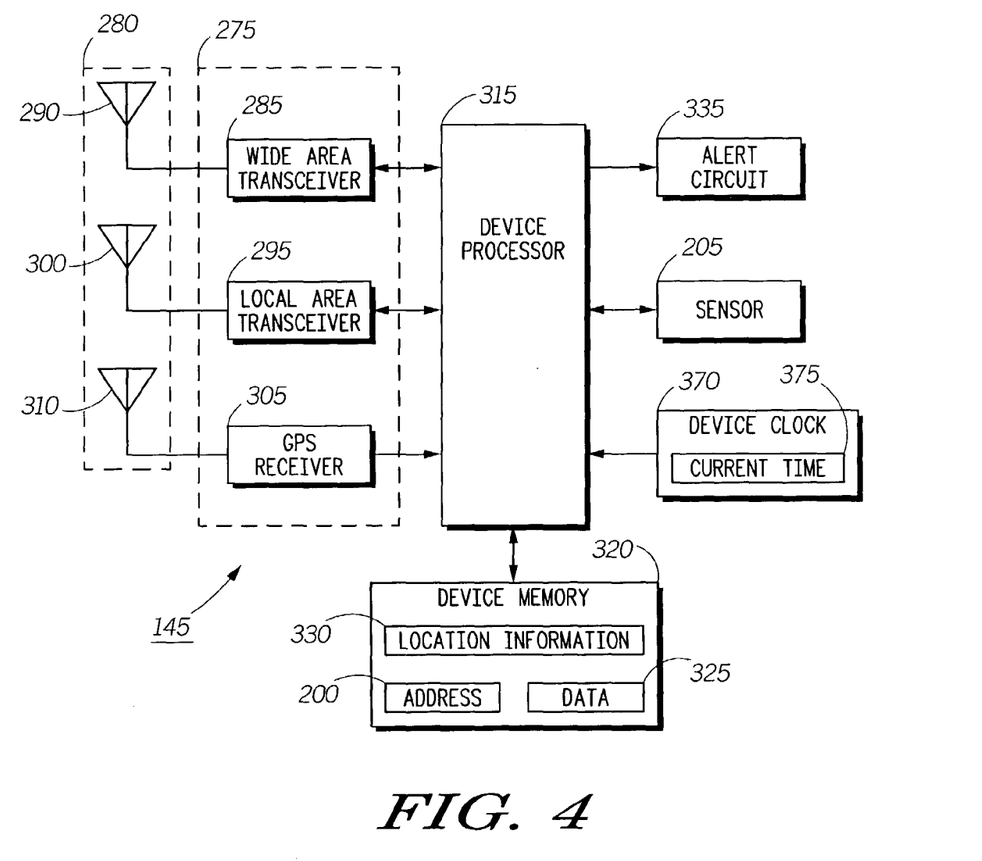
FIG. 4 is an electronic block diagram of a communication device for use within the communication system of FIGS. 1 and 2 in accordance with a preferred embodiment of the present invention.

FIG. 4 is an electronic block diagram of the communication device 145 contained within the object 120. It will be appreciated by those of ordinary skill in the art that the block diagram of FIG. 4 exemplifies any of the communication devices for any of the plurality of objects 105 within the communication system 100.

The communication device 145 preferably includes one or more device transceivers 275 coupled to one or more device antennas 280 for communication within the communication system 100. It will be appreciated by those of ordinary skill in the art that alternatively, and in accordance with the present invention, the communication device 145 can include one or more receiver circuits and one or more transmitter circuits to perform the functions of the one or more device transceivers 275. The one or more device transceivers 275 preferably include a wide area transceiver 285 coupled to a wide area antenna 290, a local area transceiver 295 coupled to a local area antenna 300, and a GPS (Global Positioning System) receiver 305 coupled to a GPS antenna 310. Each of the one or more transceivers 275 is preferably coupled to a device processor 315 for processing signals.

The local area transceiver 295 preferably is coupled to the local area antenna 300 and the device processor 315. In a preferred embodiment, Radio Frequency Identification (RFID) can be employed for communicating within the dynamic group 230 by the communication device 145 and the group controller 220. A basic RFID system can consist of the local area antenna 300 or coil (not shown), and the local area transceiver 295 connected to the device processor 315 that has been electronically programmed with unique information in a device memory 320. In accordance with the present invention, the local area antenna 300 and the local area transceiver 295 can be interrogated by the group controller 220 from the electromagnetic radio waves emitting from the communication device 145 in ranges of anywhere from one inch to one hundred feet or more, depending upon its power output and the radio frequency used. Once the communication device 145 passes through the electromagnetic zone, it detects the group controller 220 activation signal. The communication device 145 decodes one or more data 325 encoded in the device memory 320 and the one or more data 325 is routed to the requesting device. It can be appreciated by one ordinary skilled in the art that alternatively, other short-range wireless technologies such as 802.11 and Bluetooth can be utilized. The Institute of Electronic and Electrical Engineers (IEEE) has formulated the 802.11 industry standard in the 2.4 GHz ISM (Industrial, Scientific, and Medial waveband) band that defines the medium access control and physical link layers for the wireless technology.

The wide area transceiver 285 is preferably coupled to the wide area antenna 290 and the device processor 315 and is capable of processing wide area signals using wireless wide area network protocols such as GSM (Global System for Mobile Communication), TDMA (Time Division Multiple Access), CDMA (Code Division Multiple Access), umt2000, and the like. The electronic device 145 can decode the one or more data 325 encoded in the device memory 320 and the one or more data 325 can be routed to the requesting device, once the communication device 145 detects a signal through the wide area transceiver 285.

The GPS receiver 305 is preferably coupled to the GPS antenna 310 and the device processor 315 and is capable of processing Global Positioning System signals. It will be appreciated by those of ordinary skill in the art that one or more location information 330 can be provided through other means including; triangulation from cellular wide area networks and triangulation from local area networks in and out of buildings. The communication device 145 can decode the location information 330, store the location information 330 in the device memory 320, and provide the same to the requesting device, the customer communication device 215 for example, once the communication device 145 detects a requesting signal from the wide area transceiver 285 or the local area transceiver 295.

The communication device 145 preferably includes an alert circuit 335 coupled to the device processor 315 for notifications. For example, the alert circuit 335 can be used to notify through flashing light or audible sounds that there is a corrective action needed by the communication device 145. Alternatively, the local area transceiver 295 can be utilized to inform the group controller 220 that one or more sensors 205 within the communication device 145 have identified a problem. Alternatively, the wide area transceiver 285 can be utilized to inform the central server 165 that one or more sensors 205 within the communication device 145 have identified a problem.

Preferably, the communication device 145 includes a device clock 370. The device clock 370 provides timing for the device processor 315. The device clock 370 preferably includes a current time 375 for use in the operation of the communication device 145 such as for sending the current time 375 to the central server 165 as the timestamp 270. The device clock 370 also provides a source for timing of feature enhancements such as active and inactive periods of operation or periods of alerting.

Figure 5:
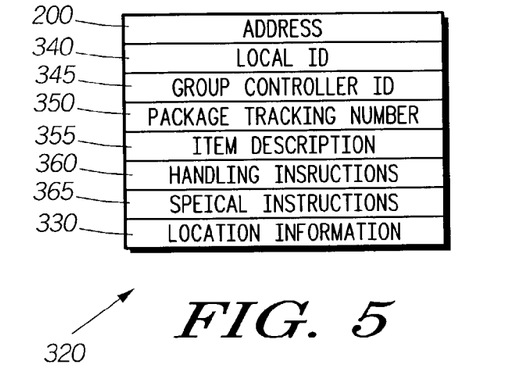
FIG. 5 is an electronic block diagram of a device memory for use within the communication device of FIG. 4 in accordance with a preferred embodiment of the present invention.

FIG. 5 is an exemplary block diagram of the device memory 320 of the communication device 145. As illustrated, the device memory 320 preferably stores the address 200, the location information 330, and the one or more data 325. Preferably, the address 200 is the device identification within the communication system 100 for the communication device 145. One of ordinary skill in the art of network topology will appreciate that identification within the communication system 100 can be accomplished by IPv6 for example. The one or more data 325 preferably includes a local ID (identification) 340. The local ID 340 is the device identification used for communication within a local area network such as the dynamic group 230 of FIG. 2. In a preferred embodiment of the present invention, the local ID 340 is a shortened address from a networking IP6 or IP4 address that would allow for additional power savings to be obtained. The group controller 220 serving as the proxy between the communication device 145 and the wide area communication network 160 within the communication system 100 can assign a shortened 8 bit address, for example, rather then a 128 bit network address or wide area cellular address. Alternatively, it will be appreciated by one of ordinary skill in the art that the local area network used for communication within the dynamic group 230, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The dynamic group 230 can alternatively use a physical network media such as 802.11, Bluetooth, RFID or other media to connect devices or other local area networks.

The one or more data 325 stored in the device memory 320 preferably further includes a current group controller ID 345. The current group controller ID 345 is the identification of which network access point the communication device 145 is communicating to within the dynamic group 230. The current group controller ID 345 in one embodiment can be a shorten address, 8 bits, to achieve additional power savings.

The one or more data 325 preferably further includes a package tracking number 350, which is a unique identification assigned by the central server 165 and is maintained within the database 210 until delivery of the object 120. The one or more data 325 preferably further includes an item description 355, which is a human readable form of information describing the object content 125 of the object 120. The one or more data 325 preferably further includes one or more handling instructions 360 identifying the attributes that are required while delivering the object 120 to the final destination. Minimal or maximum storage temperature or whether the material inside is hazardous are examples of the one or more handling instructions 360. The one or more data 325 preferably further includes one or more special instructions 365 including additional information that aids in the delivery and handling of the object 120. Some examples of the one or more special instructions are information about the object content 125 being priority mail or guaranteed delivery time or instructions on time of day to drop the object 120 off. The location information 330 is a stored representation of the current location or the last known location of the object 120. The location information 330 can be obtained from the GPS receiver 305 and processed by the device processor 315 and stored in the device memory 320. Alternatively, the group controller 220 can further increase the power savings of the communication devices within the dynamic group 230 by providing the location information 330 to each of the communication devices.

Figure 6:
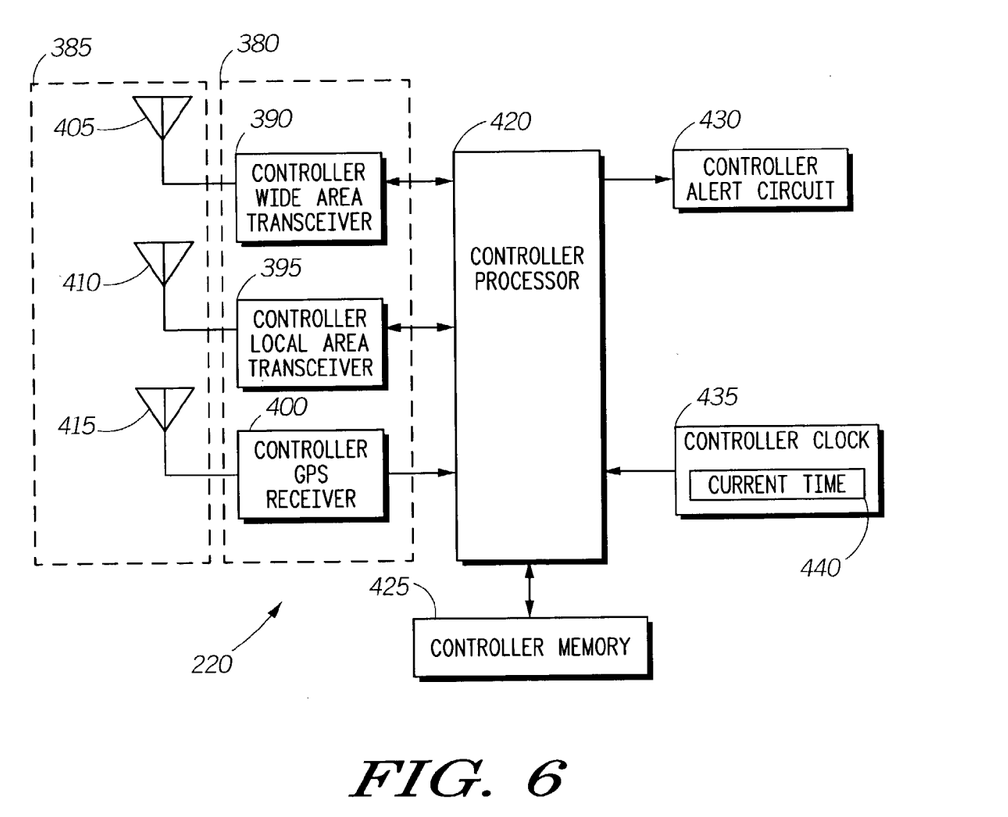
FIG. 6 is an electronic block diagram of a group controller for use within the communication system of FIGS. 1 and 2 in accordance with a preferred embodiment of the present invention.

FIG. 6 is an electronic block diagram of the group controller 220. It will be appreciated by those of ordinary skill in the art that the block diagram of FIG. 6 exemplifies any of the group controllers within the communication system 100.

The group controller 220 preferably includes one or more controller transceivers 380 coupled to one or more controller antennas 385 for communication within the communication system 100. It will be appreciated by those of ordinary skill in the art that alternatively, and in accordance with the present invention, the group controller 220 can include one or more receiver circuits and one or more transmitter circuits to perform the functions of the one or more controller transceivers 380. The one or more controller transceivers 380 preferably include a controller wide area transceiver 390 coupled to a controller wide area antenna 405, a controller local area transceiver 395 coupled to a controller local area antenna 410, and a controller GPS (Global Positioning System) receiver 400 coupled to a controller GPS antenna 415. Each of the one or more controller transceivers 380 are preferably coupled to a controller processor 420 for processing signals.

The controller local area transceiver 395 is coupled to the controller local area antenna 410 and the controller processor 420. In a preferred embodiment, Radio Frequency Identification (RFID) can be employed for communicating within the dynamic group 230 by the communication device 145 and the group controller 220. A basic RFID) system can consist of; the controller local area antenna 410 or coil (not shown), and the controller local area transceiver 395 connected to the controller processor 420 that has been electronically programmed with unique information in a controller memory 425. The controller local area antenna 410 and the controller local area transceiver 395 can be used to interrogate the communication device 145 from the electromagnetic radio waves emitting from the controller local area antenna 410 in ranges of anywhere from one inch to one hundred feet or more, depending upon its power output and the radio frequency used. It can be appreciated by one ordinary skilled in the art that alternatively, other short-range wireless technologies such as 802.11 and Bluetooth can be utilized.

The controller wide area transceiver 390 is coupled to the controller wide area antenna 405 and the controller processor 420 and is capable of processing wide area signals using wireless wide area network protocols such as GSM (Global System for Mobile Communication), TDMA (Time Division Multiple Access), CDMA (Code Division Multiple Access), umt2000, and the like. The group controller 220 can communicate with the central server 165 by utilizing the wide area communication network 160 and the plurality of transceivers 155.

The controller GPS receiver 400 is preferably coupled to the controller GPS antenna 415 and the controller processor 420 and is capable of processing Global Positioning System (GPS) signals. The GPS signal is processed by the controller processor 420 and is stored in the controller memory 425.

The group controller 220 preferably further includes a controller alert circuit 430. The controller alert circuit 430 can be utilized to identify problems with the various communication devices within the dynamic group 230 of the group controller 220. For example, the object 120 can include perishable food that if stored above a certain temperature for a period of time will result in spoilage. Additionally, the group controller 220 can send an alert message to the central server 165 through the plurality of transceivers 155 and the wide area communication network 160 with similar information.

Preferably, the group controller 220 includes a controller clock 435. The controller clock 435 provides timing for the controller processor 420. The controller clock 435 preferably includes a controller current time 440 for use in the operation of the group controller 220 such as for sending the controller current time 440 to the central server 165 as the timestamp 270 for each of the object information of the objects within the dynamic group 230. The controller clock 435 is utilized for time stamping each record as it is received by the group controller 220 from one or more communication devices within the one or more objects of the dynamic group 230. The controller clock 435 also provides a source for timing of feature enhancements such as active and inactive periods of operation or periods of alerting.

Figure 7:
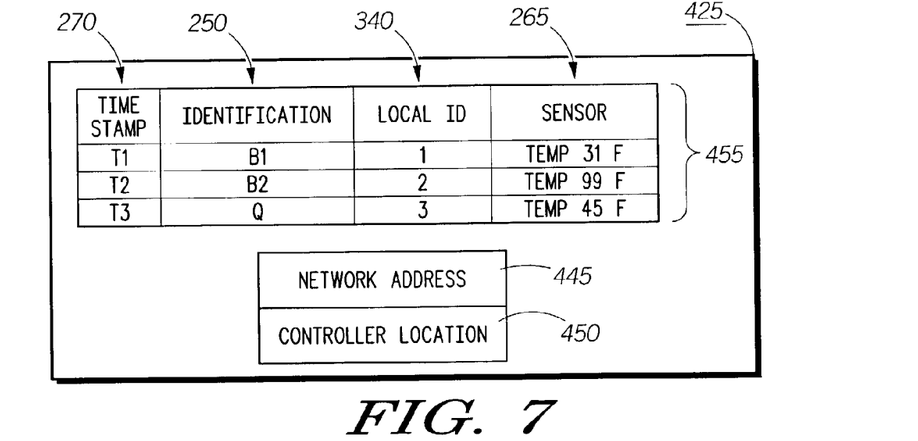
FIG. 7 is an electronic block diagram of a controller memory for use within the group controller of FIG. 6 in accordance with a preferred embodiment of the present invention.

FIG. 7 is an exemplary block diagram of the controller memory 425 in the group controller 220. As illustrated, the controller memory preferably stores a network address 445, a controller location information 450, and one or more object records 455 associated with each of the objects within the dynamic group 230. Each of the one or more object records 455 preferably includes the timestamp 270, the identification 250; the local identification (ID) 340, and the sensor information 265. In one embodiment of the present invention the central server 165 can set a threshold value that the group controller 220 will report if one or more objects within the dynamic group exceeds the threshold.

In a preferred embodiment, the customer communication device 215 can obtain information on object content 125 of the object 120 by entering the package tracking number 350 into a user interface. The package tracking number 350 is sent to the central server 165 and is translated to the networking address 445 and is sent through the wide area communication network 160 and the plurality of transceivers 155 such as the second transceiver 175 of FIG. 2. The second transceiver 175 then communicates the request to obtain information to the group controller 220. The group controller 220 can then either interrogate the communication device 145 for updated information or already have this information available from previous interrogation with the communication device 145. The device's tracking information on the object content 125 is then transmitted from the group controller 220 to the wide area communication network 160 through the second transceiver 175. The central server 165 will update the database 210 with the information on the contents of the object 120. In addition, the central server 165 will send the requested information back to the customer communication device 215 through the wide area communication network 160.

Figure 8:
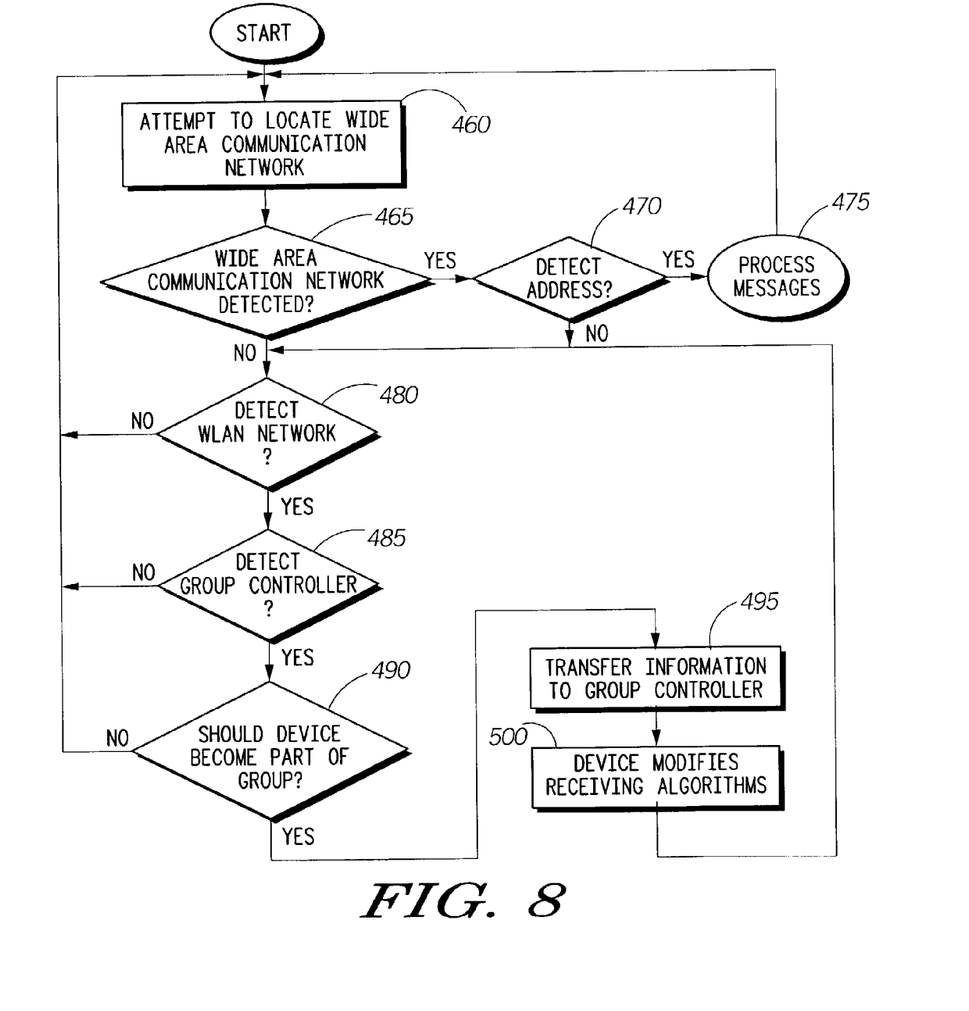
FIGS. 8 and 9 are flowcharts illustrating the operation of the communication device of FIG. 4 in accordance with a preferred embodiment of the present invention.

FIG. 8 is a flowchart illustrating one embodiment of the operation of the communication device 145 in accordance with the present invention. Specifically, FIG. 8 illustrates the process by which the communication device 145 establishes communication with the central server 165 using RFID. In Step 460, the communication device 145 first attempts to locate the wide area communication network 160. For example the wide area communication network 160 can be a CDMA, GSM, or GPRS network. In step 465, the communication device 145 determines if the wide area communication network 160 has been detected. When in Step 465 the wide area communication network 160 has been detected, then in step 470, the communication device 145 determines if the wide area communication network 160 is the proper network (i.e.: the address 200 is within the wide area communication network 160) and if so it registers with the wide area communication network 160 and checks for messages. When, in step 470, the communication device 145 detects its address 200 and/or the presence of messages then in step 475, the communication device 145 processes those messages utilizing the standard method for receiving messages within the wide area communication network 160. An example of a message could be an SMS (Short Message Service) message request as to the location or condition of the object 120 in which the communication device 145 resides from the customer communication device 215. The communication device 145 can reply to the request utilizing standard messaging methods such as electronic mail, SMS, EMS (Enhanced Messaging Service), voice or other methods of communication. Once the message processing has been completed in step 475, the communication device 145 operation returns to step 460. When no wide area communication network 160 is detected in Step 465 or when no messages with the address 200 are detected in Step 470, the operations continues with Step 480, in which the communication device 145 determines if there is a WLAN available for communication. For example, the WLAN can be used for communication within an available dynamic group within the communication system 100. When in step 480 no WLAN is detected the operation of the communication device 145 returns to step 460. In Step 485, when in step 480, the communication device 145 detects the presence of a WLAN it looks for the group controller 220. The group controller 220, as described previously herein is a central device, which has the function of dynamically building groups of communication devices and then taking over some of the grouped devices reporting responsibilities. When the group controller 220 is not detected in Step 485, the operation of the communication device 145 returns to step 460. In Step 490, when the group controller 220 is detected in step 485, then the communication device 145 negotiates with the group controller 220 to determine if it can become part of it's dynamic group 230 associated with the group controller 220. The dynamic grouping between the group controller 220 and the communication device 145 can be based on previous instructions from the central server 165 as to which group controller and which communication device should be grouped. For example, the group controller 220 can receive from the central server 165 the address 200 of the communication device 145 within the object 120 to be grouped within the dynamic group 230 for which the group controller 220 is responsible. Alternatively, the negotiation can include determining if the group controller 220 has a similar location destination as the object 120 for which the communication device 145 is associated. In this example the central server 165 communicates with the plurality of group controllers to instruct the group controller 220 to form the dynamic group 230 based upon the object's location destination information. For example, an object including a communication device is being sent from Atlanta to an address in Miami. First the communication device would determine which group controller was going to Miami. There may be several group controllers within a geographical and/or communication range of the object with destinations all over the world. Once the object including the communication device is delivered to Miami, the communication device can negotiate with another group controller that has responsibility for the geographical area that contained its mailing address. The communication device can look for a priority group controller instead of the group controller with a similar destination. For example, when an object including a communication device is destined for Miami and is assigned overnight delivery, the communication device can negotiate with the group controller responsible for overnight routing rather than the standard group controller headed for Miami. When in step 490, the communication device 145 determines that there is no dynamic group that it should be part of the operation of the communication device 145 returns to step 460 and continues its normal programmed monitoring of the communication networks. In Step 495, when the communication device in step 490 determines that is should be part of a dynamic group 230 then the communication device 145 and the group controller 220 transfer information between them. For example some of the information that is transferred can consist of location information, sensor data and method of contact for the object for which the communication device 145 is associated with. This information is stored in the device memory 320 of the communication device 145 and in the controller memory 425 of the group controller 220 as previously described herein. Optionally, the communication device can indicate that the negotiation has taken place. Next, in Step 500, once the method of communication has been transferred to the group controller 220, the communication device 145 modifies its receiving algorithms. The communication device 145 now relies on the group controller 220 to communicate information about the communication device 145 to the networks. This allows the communication device 145 to reduce the amount of energy it normally would normally use for monitoring the networks by not looking for the wide area communication network 160 and reducing the amount of time it looks for a WLAN connection. After step 500, the communication device 145 monitors the WLAN network in step 480 but the frequency in which it monitors is reduced in step 500.

Figure 9:
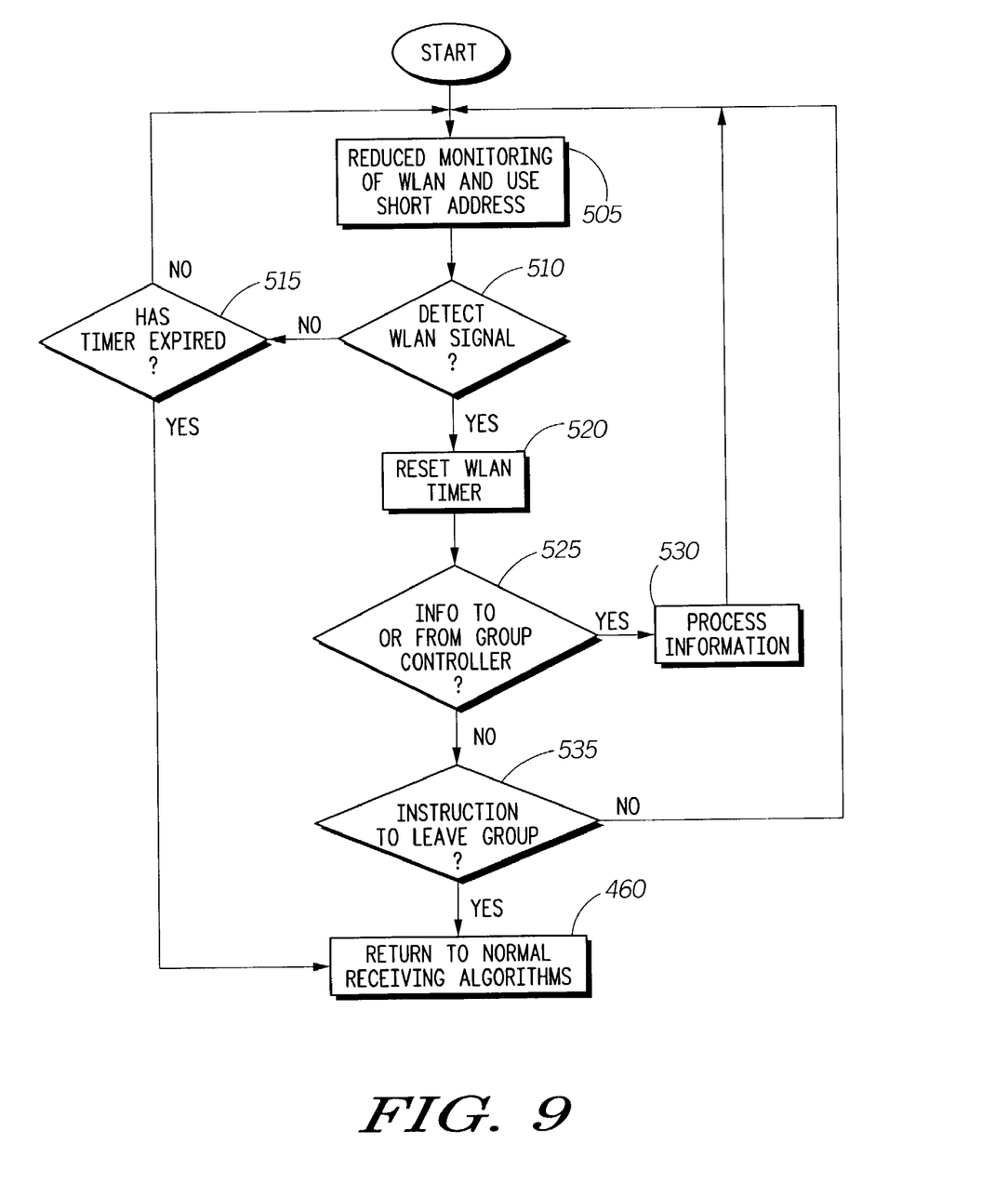

FIG. 9 is a flowchart illustrating one embodiment of the operation of the communication device 145 in accordance with the present invention. Specifically, FIG. 9 is the detail of the modifications to the RFID receiver algorithm. Beginning with step 505, the communication device 145 only monitors the WLAN at a reduced duty cycle and with a short address, which is negotiated between the communication device 145 and the group controller 220. Next, at step 510 the communication device 145 monitors the WLAN to ensure that it is still in range of the group controller 220. When in step 510 the communication device 145 determines that it is unable to detect the group controller 220, it proceeds to step 515 where it calculates how long it has been out of contact with the group controller 220 and if a timer has expired. When in step 515 the communication device 145 has only been out of contact for a short period of time, (i.e.: the timer has not expired), then the operation of the communication device 145 proceeds back to step 505. When in Step 515 the communication device 145 determines if it has been out of contact with the group controller 220 for an excessive amount of time (negotiated between the communication device 145 and the group controller 220) and the timer has expired the device returns to normal receiving algorithms such as Step 460 of the operation of FIG. 8. This method ensures a communication device does not accidentally leave the control area of the group controller 220 and become permanently lost.

When in step 510 the communication device 145 detects a WLAN signal it resets the WLAN timer in step 520. Next, in step 525, the communication device 145 determines if communication with the group controller 220 is necessary. The communication may be for example sensor data the communication device 145 is monitoring or information that has come over the WAN to the group controller 220 that is for the communication device 145. When communication is necessary in step 525, then in Step 530 the messages are communicated and processed. The operation of the communication device 145 then returns to step 505 where it continues to monitor the WLAN at an improved battery save interval. When in step 525 the communication device 145 determines that there is no information to share it moves to step 535. In Step 535 the communication device 145 searches for an instruction from the group controller 220 to leave the dynamic group 230. When no instruction is received by the communication device 145 in Step 535, the operation of the communication device 145 returns to monitoring the WLAN at step 505. When in step 535, the group controller 220 instructs the communication device 145 to leave the dynamic group 230, the communication device 145 resumes its normal receive mode operation and returns to step 460 of FIG. 8.

Figure 10:
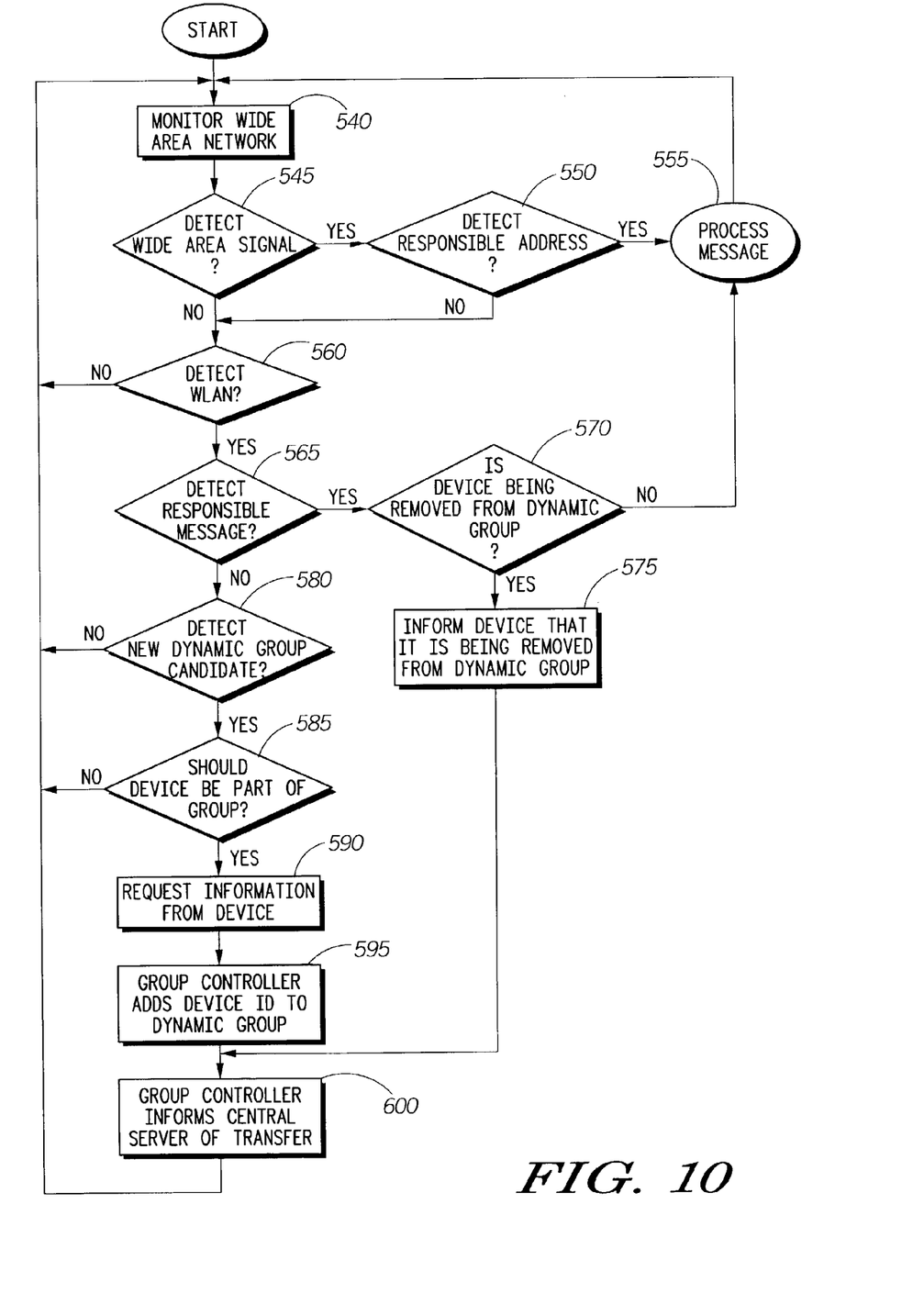
FIG. 10 is a flowchart illustrating the operation of the group controller of FIG. 6 in accordance with a preferred embodiment of the present invention.

FIG. 10 is a flowchart illustrating the operation of the group controller 220 in accordance with a preferred embodiment of the present invention. The operation of the group controller 220 begins with Step 540 in which the group controller 220 monitors the wide area communication network 160. Next, in Step 545, the group controller 220 checks for detection of one or more wide area signals from the wide area communication network 160. In Step 550, when one or more wide area signals are detected in Step 545, the group controller 220 checks for detection of one or more addresses and/or identifications of communication devices in which the group controller 220 is responsible. (i.e. objects that are members of the dynamic group 230 for which the group controller 220 is responsible.) When addresses for which the group controller 220 is responsible are detected in Step 550, the group controller 220 processes the associated messages in Step 555. The operation of the group controller 220 then returns to Step 540.

When no wide area signal is detected in Step 545 or no address for which the group controller 220 is responsible is detected in Step 550, the operation of the group controller 220 continues with Step 560. In Step 560, the group controller 220 checks for detection of one or more WLANs. When no WLAN is detected in Step 560, the operation of the group controller 220 returns to Step 540. When a WLAN is detected in Step 560, the operation of the group controller 220 continues with Step 565 in which the group controller 220 checks for messages for which the group controller 220 is responsible within the WLAN. In Step 570, when the group controller 220 detects messages within the WLAN for which it is responsible in Step 565, the group controller 220 determines whether the message includes information that a communication device is being removed from the dynamic group. For example, the object 120 may have traveled to a destination point where the object will change transportation vehicles and therefore is removed from the dynamic group 230. When the message does not include information that a communication device is being removed from the dynamic group, the operation of the group controller 220 continues at Step 555 and the message is processed. When the message includes information that a communication device is being removed from the proxy list in Step 570, the operation of the group controller 220 continues with Step 575 in which the group controller 220 informs the communication device 145 that it is being removed from the communication responsibility of the group controller 220.

When the group controller 220 does not detect any messages for which it is responsible in Step 565, the operations continues with Step 580 in which the group controller 220 checks for detection of a new dynamic group candidate. When no new dynamic group candidate is detected in Step 580, the operation of the group controller 220 returns to Step 540. When a new dynamic group candidate is detected in Step 580, the operation continues with Step 585 in which the group controller 220 determines whether the new dynamic group candidate should be included within the dynamic group 230 of the group controller 220. When the new dynamic group candidate should not be included within the dynamic group 230 in Step 585, the operation returns to Step 540. When the new dynamic group candidate should be part of the dynamic group 230 in Step 585, the operation continues at Step 590 in which the group controller 220 requests information from the new communication device regarding the object content, object location, and the like associated with the new communication device. Next, in Step 595, the group controller 220 adds the device ID for the new communication device to the dynamic group. Next, and after Step 575, the group controller 220 informs the central server 165 that it is now responsible for communication for the new communication device. The operation of the group controller 220 then returns to Step 540.

Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A communication system for dynamic management of a plurality of objects, the communication system comprising:
   a central server;
   at least one transceiver in communication with the central server;
   at least one group controller, which has a group controller destination, in communication with the central server
   at least one communication device located in proximity to at least one object wherein the at least one communication device is operable to transmit information regarding the at least one object to the central server (a) through the at least one transceiver and the at least one group controller and (b) through the at least one transceiver and bypassing the at least one group controller; and
   wherein the group controller is responsible for communication between the central server and the at least one communication device about the at least one object when the group controller destination and a destination of the at least one object are substantially similar.

2. A communication system as recited in claim 1, wherein the at least one object has an associated object location, and further wherein the at least one group controller is configured to determine it is responsible for communication between the central server and the at least one communication device about the object via a wide area network when the at least one object location is within a communication range of the at least one group controller.

3. A communication system as recited in claim 1, wherein the at least one group controller is configured to determine it is responsible for communication between the central server and the at least one communication device about the at least one object in response to receiving an instruction from the central server.

4. A communication system as recited in claim 1, wherein the at least one group controller is configured to determine it is responsible for communication between the central server and the at least one communication device about the at least one object in response to receiving an instruction from the object.

5. A communication system as recited in claim 1 wherein the at least one group controller further includes group controller network address, and further wherein the at least one transceiver communicates with the at least one object using the group controller network address 6. A communication system as recited in claim 1, wherein the at least one group controller comprises a first group controller and a second group controller; and
   wherein the at least one communication device communicates with the first group controller at a first object location and with the second group controller at a second object location.

7. A communication system as recited in claim 6, wherein the at least one communication device communicates directly with the at least one transceiver at a third object location.

8. A communication system, for dynamic management of a plurality of objects, the communication system comprising:
   a central server;
   at least one transceiver in communication with the central server;
   at least one group controller, which has a group controller priority, in communication with the central server;
   at least one communication device located in proximity to at least one object, wherein the at least one communication device is operable to transmit information regarding the at least one object to the central server (a) through the at least one transceiver and the at least one group controller and (b) through the at least one transceiver and bypassing the at least one group controller; and
   wherein the group controller is responsible for communication between the central server and the at least one communication device about the at least one object when the group controller priority and a priority of at least one object are substantially similar.

9. A communication system as recited in claim 8 wherein the at least one group controller further includes
   a group controller network address, and further wherein at least one transceiver communicates with the at least one object using the group controller network address.

10. A communication system as recited in claim 8, wherein the at least one group controller comprises a first group controller, and a second group controller; and
    wherein the at least one communication device communicates within the first group controller at a first object location, and with the second group controller at a second object location.

11. A communication system as recited in claim 10, wherein the at least one communication device communicates directly with the at least one transceiver at a third object location.

12. A communication system as recited in claim 8, wherein the at least one object has an associated object location, and the at least one group controller is configured to determine it is responsible for communication between the central server and the at least one communication device about the object via a wide area network when the at least one object location is within a communication range of the at least one group controller.

13. A communication system as recited in claim 8, wherein the at least one group controller is configured to determine it is responsible for communication between the central server and the at least one communication device about the object in response to receiving an instruction from the central server.

14. A communication system as recited in claim 8, wherein the at least one group controller is configured to determine it is responsible for communication between the central server and the at least one communication device about the at least one object in response to receiving an instruction from the at least one object.

15. A method within a communication device the method comprising:
    identifying a dynamic group for communication within a wireless local area network;
    identifying a group controller operating within the dynamic group by:
       determining an object destination;
       comparing the object destination to a plurality of group controller destinations associated with a plurality of group controllers; and
       identifying the group controller having a group controller destination that is substantially similar to the object destination;
    obtaining permission from the group controller to become a member of the dynamic group with which the group controller is operating;
    transferring a plurality of information to the group controller; and
    within the group controller:
       communicating within the communication system on behalf of the communicating device.

16. A method as recited in claim 15 further comprising:
    within the communication device:
       modifying one or more receiving algorithms.

17. A method as recited in claim 16 wherein the modifying the one or more receiving algorithms within the communication device comprises:
    monitoring the wireless local area network at a reduced duty cycle;
    detecting the group controller;
    detecting an instruction from the group controller to leave the dynamic group; and
    resuming normal receive mode operation.

18. A method as recited in claim 16 wherein the modifying the one or more receiving algorithms within the communication device comprises:
    monitoring the wireless local area network at a reduced duty cycle;
    determining that the communication device is out of range of detection of the group controller;
    calculating the length of time the communication device has been out of contact with the group controller;
    comparing the length of time to a timer; and returning to normal receiving algorithms when the length of time exceeds the timer.

19. A method within a communication device the method comprising:
    identifying a dynamic group for communication within a wireless local area network;
    identifying a group controller operating within the dynamic group by:
       determining an object priority;
       comparing the object priority to a plurality of group controller priorities associated with a plurality of group controllers; and identifying the group controller having a group controller priority that is substantially similar to the object priority;

obtaining permission from the group controller to become a member of the dynamic group with which the group controller is operating;

transferring a plurality of information to the group controller; and within the group controller:
communicating within the communication system on behalf of the communication device.

20. A method as recited in claim 19 further comprising:
within the communication device:
modifying one or more receiving algorithms.

21. A method as recited in claim 20 wherein the modifying the one or more receiving algorithms within the communication device comprises:
monitoring the wireless local area network at a reduced duty cycle;
detecting the group controller;
detecting an instruction from the group controller to leave the dynamic group; and
resuming normal receive mode operation.

22. A method as recited in claim 20 wherein the modifying the one or more receiving algorithms within the communication device comprises:
monitoring the wireless local area network at a reduced duty cycle;
determining that the communication device is out of range of detection of the group controller;
calculating the length of time the communication device has been out of contact with the group controller;
comparing the length of time to a timer; and returning to normal receiving algorithms when the length of time exceeds the timer.

23. A method within a communication device, the method comprising:
identifying a dynamic group for communication within a wireless local area network;
identifying a group controller operating within the dynamic group;
obtaining permission from the group controller to become a member of the dynamic group with which the group controller is operating;
transferring a plurality of information to the group controller;
wherein the plurality of information comprises information about an object in which the communication device is proximately located, the information selected from a group consisting of an object content, an object location, an object sensor data, and an object method of contact; and within the group controller;
modifying one or more receiving algorithms within the communication device, which comprises:
monitoring the wireless local area network at a reduced duty cycle;
detecting the group controller;
detecting an instruction from the group controller to leave the dynamic group; and
resuming normal receive mode operation; and
communicating within the communication system on behalf of the communication device.

24. A method as recited in claim 23 wherein the monitoring step further comprises monitoring the wireless local area network utilizing a short address.

25. A method within a communication device, the method comprising:
identifying a dynamic group for communication within a wireless local area network;
identifying a group controller operating within the dynamic group;
obtaining permission from the group controller to become a member of the dynamic group with which the group controller is operating;
transferring a plurality of information to the group controller;
wherein the plurality of information comprises information about an object in which the communication device is proximately located, the information selected from a group consisting of an object content, an object location, an object sensor data, and an object method of contact; and within the group controller:
modifying one or more receiving algorithms within the communication device comprises:
monitoring the wireless local area network at a reduced duty cycle;
determining that the communication device is out of range of detection of the group controller;
calculating the length of time the communication device has been out of contact with the group controller;
comparing the length of time to a timer; and returning to normal receiving algorithms when the length of time exceeds the timer; and
communicating within the communication system on behalf of the communication device.

26. A method as recited in claim 25 wherein the monitoring step further comprises monitoring the wireless local area network utilizing a short address.

27. A method as recited in claim 25 wherein a length of time of the timer is negotiated between the communication device and the group controller.

28. A method as recited in claim 25 wherein the modifying the one or more receiving algorithms within the communication device further comprises:
modifying the receiver algorithm to monitor the wide area network at a reduced rate.

29. A method as recited in claim 25 wherein the modifying the one or more receiving algorithms within the communication device further comprises:
modifying the receiver algorithm to stop the monitoring of the wide area network.

* * * * *